(12) United States Patent
Steffanut

(10) Patent No.: US 7,625,621 B2
(45) Date of Patent: *Dec. 1, 2009

(54) AMINO ANTIPYRINE BASED AZO LIGANDS AND THEIR METAL COMPLEXES FOR USE AS OPTICAL RECORDING MEDIA

(75) Inventor: Pascal Steffanut, Kembs-Loechlé (FR)

(73) Assignee: Clariant Finance (BVI) Limited, Tortola (VG)

(*) Notice: Subject to any disclaimer, the term of this patent is extended or adjusted under 35 U.S.C. 154(b) by 399 days.

This patent is subject to a terminal disclaimer.

(21) Appl. No.: 11/658,823

(22) PCT Filed: Jul. 29, 2005

(86) PCT No.: PCT/EP2005/053724

§ 371 (c)(1),
(2), (4) Date: Jan. 26, 2007

(87) PCT Pub. No.: WO2006/010773

PCT Pub. Date: Feb. 2, 2006

(65) Prior Publication Data

US 2008/0317994 A1 Dec. 25, 2008

(30) Foreign Application Priority Data

Jul. 29, 2004 (EP) ................... 04018055

(51) Int. Cl.
*B32B 3/02* (2006.01)
*G11B 7/24* (2006.01)
*C09B 45/00* (2006.01)
*C09B 29/42* (2006.01)

(52) U.S. Cl. .............. 428/64.4; 430/270.16; 534/710; 534/766; 534/769

(58) Field of Classification Search ............. 428/64.4; 534/707, 710, 766, 767, 770, 771, 769; 430/270.16
See application file for complete search history.

(56) References Cited

U.S. PATENT DOCUMENTS

| | | | | |
|---|---|---|---|---|
| 2,446,662 | A | * | 8/1948 | Nies .............. 534/712 |
| 2,993,884 | A | * | 7/1961 | Ruegg et al. ............ 534/706 |
| 4,216,145 | A | | 8/1980 | Battistic et al. |
| 4,626,496 | A | | 12/1986 | Sato |
| 5,272,047 | A | | 12/1993 | Kovacs et al. |
| 5,294,471 | A | | 3/1994 | Evans et al. |
| 5,441,844 | A | | 8/1995 | Shimoda |
| 5,594,128 | A | | 1/1997 | Wolleb |
| 5,641,879 | A | | 6/1997 | Wolleb et al. |
| 5,808,015 | A | * | 9/1998 | Hamprecht ............. 534/771 |
| 5,851,621 | A | | 12/1998 | Wolleb et al. |
| 5,871,882 | A | | 2/1999 | Schmidhalter |
| 5,955,615 | A | * | 9/1999 | Hamprecht ............. 546/286 |
| 5,958,650 | A | | 9/1999 | Wolleb et al. |
| 5,998,093 | A | | 12/1999 | Tomurn et al. |
| 6,103,331 | A | | 8/2000 | Kanno |
| 6,162,520 | A | | 12/2000 | Misana et al. |
| 6,168,843 | B1 | * | 1/2001 | Kambe et al. .............. 428/64.1 |
| 6,627,742 | B1 | * | 9/2003 | Hamprecht ............. 534/771 |
| 6,926,943 | B2 | | 8/2005 | Berneth et al. |
| 2002/0091241 | A1 | | 7/2002 | Wang et al. |
| 2003/0175616 | A1 | | 9/2003 | Berneth et al. |
| 2007/0219343 | A1 | | 9/2007 | Kroehnke |

FOREIGN PATENT DOCUMENTS

| | | |
|---|---|---|
| CH | 592148 | 7/1977 |
| DE | 1076078 | 2/1959 |
| EP | 232427 | 8/1987 |
| EP | 0337209 | 10/1989 |
| EP | 353393 | 2/1990 |
| EP | 373643 | 6/1990 |
| EP | 463550 | 1/1992 |
| EP | 519419 | 6/1992 |
| EP | 492508 | 7/1992 |
| EP | 509423 | 10/1992 |
| EP | 511590 | 11/1992 |
| EP | 511598 | 11/1992 |
| EP | 513370 | 11/1992 |
| EP | 514799 | 11/1992 |
| EP | 518213 | 12/1992 |
| EP | 519423 | 12/1992 |
| EP | 568877 | 11/1993 |
| EP | 575816 | 12/1993 |
| EP | 600427 | 6/1994 |
| EP | 649880 | 10/1994 |
| EP | 649133 | 4/1995 |
| EP | 649884 | 4/1995 |
| EP | 712904 | 5/1995 |
| EP | 676751 | 10/1995 |
| EP | 822544 | 2/1998 |
| EP | 822546 | 2/1998 |
| EP | 833316 | 4/1998 |
| EP | 0853314 | 4/1998 |
| EP | 844243 | 5/1998 |
| EP | 903733 | 3/1999 |
| EP | 0996123 | 4/2000 |

(Continued)

OTHER PUBLICATIONS

STN search history of phenazone-azo-hydroxypyridomethide type dyes.*

(Continued)

*Primary Examiner*—Callie E Shosho
*Assistant Examiner*—Gerard T Higgins
(74) *Attorney, Agent, or Firm*—Anthony A. Bisulca

(57) ABSTRACT

The present invention provides novel azo dye material based on antipyrine azo structure and metal complexes containing such azo compounds which are suitable for optical recording media. The dyes exert high light-fastnesses properties and excellent recording characteristics. In particular the invention relates to optical layers comprising such dyes, to a method for manufacturing such optical layers and to optical recording media comprising such optical layers.

11 Claims, No Drawings

FOREIGN PATENT DOCUMENTS

| EP | 1056078 | 11/2000 |
|----|---------|---------|
| EP | 1130584 | 9/2001 |
| EP | 1517317 | 3/2005 |
| EP | 1528085 | 5/2005 |
| JP | 58125246 | 7/1983 |
| JP | 3268994 | 11/1991 |
| JP | 63288785 | 11/1998 |
| JP | 633288786 | 11/1998 |
| JP | 11028865 | 2/1999 |
| WO | WO 98/14520 | 4/1998 |
| WO | WO 00/09522 | 2/2000 |
| WO | WO 01/75873 | 10/2001 |

OTHER PUBLICATIONS

PCT International Search Report for PCT/EP 2005/053724 mailed Nov. 11, 2005.

PCT Written Opinion of the International Searching Authority for PCT/EP 2005/053724, mailed Nov. 11, 2005.

English Abstract for CH 592148, Jul. 15, 1977.

Bezdekova et al. "Spektrophotomertrische Untersuchung der Reaktion des Lanthans, Samariums, Gadoliniums und Kupfer (II) mit Diantipyrylazo," Collection Czechoslov. Chem. Commun. vol. 33, pp. 4178-4187 (1968).

Shoukry et al. "Metal Complexes of 2-hydroxynaphthylazoantipyrine," Synth. React. Inorg. Met-org Chem. 27 (5), pp. 737-750 (1997).

English Abstract for JP 58125246, Jul. 26, 1983.

English Abstract for JP 63288785, Nov. 25, 1998.

English Abstract for JP 633288786, Nov. 25, 1998.

English Abstract for JP 3268794, Nov. 29, 1991.

English Abstract for DE 1076078, Feb. 25, 1959.

English Abstract for JP 04-025493, Jan. 29, 1992.

English Abstract for JP 03-268994, Nov. 29, 1991.

English Abstract for JP 04-167239, Jun. 15, 1992.

English Abstract for JP 11-028865, Feb. 2, 1999.

* cited by examiner

AMINO ANTIPYRINE BASED AZO LIGANDS AND THEIR METAL COMPLEXES FOR USE AS OPTICAL RECORDING MEDIA

TECHNICAL BACKGROUND

Organic dyes have attracted considerable attentions in the field of diode-laser optical storage. Recordable Compact Discs, so-called CD-R, as the first example of discs using this technology, are known from "Optical Data Storage 1989", Technical Digest Series, Vol. 1, 45 (1989). They are writable at a wavelength of from 770 to 830 nm and readable at a reduced readout power. As recording media it is possible to use, for example, thin layers of cyanine dyes (JP-58/125246), phthalocyanines (EP-A-676 751, EP-A-712 904), azo dyes (U.S. Pat. No. 5,441,844), double salts (U.S. Pat. No. 4,626,496), dithioethene metal complexes (JP-A-63/288785, JP-A-63/288786), azo metal complexes (U.S. Pat. No. 5,272,047, U.S. Pat. No. 5,294,471, EP-A-649 133, EP-A-649 880) or mixtures thereof (EP-A-649 884). Such an organic colorant type optical recording medium, by being decomposed under laser irradiation changes its optical characteristics, induces a decrease in the layer thickness, as well as a subsequent deformation of the substrate.

By using more advanced lasers, emitting in the range of from 600 to 700 nm it was possible to achieve a 6 to 8 fold improvement in recording density, in that the track spacing (distance between two turns of the information track) and the size of the pits as well as the redundancy each were reduced to approximately half the value in comparison with conventional CD-R's.

This new disc format, so-called recordable digital versatile discs (DVD-R), may contain, as recording layer, numerous dyes also based on phthalocyanine, hemicyanine, cyanine and metallized azo structures. These dyes are suitable in the respective field with the laser wavelength criteria. Other general requirements for a good dye media are strong absorption, high reflectance, high recording sensitivity, low thermal conductivity as well as light and thermal stabilities, durability for storage and non-toxicity.

Due to a large increase of the original recording speed, most of the known recording dye layers do not possess the required properties to a satisfactory extent.

Metal chelate compounds comprising azo ligands and metal, as proposed for example in JP-A-3-268994, are currently still the closest to high-speed requirements.

It has therefore been an objective of the invention to provide new dyes, suitable for high-density and high speed recording materials in a laser wavelength range of from 500 to 700 nm.

It further has been an objective of the invention that the new dyes are easy to synthesize with high yields and high purities at low costs. It has been found that dyes according to the invention meet the above objectives.

SUMMARY OF THE INVENTION

The present invention provides novel azo dye material and metal complexes containing such azo compounds which fit with the above requirements and which are suitable for optical recording media. The present invention further relates to an optical recording medium which is excellent in recording and reading-out characteristics by using a shortwave semiconductor laser and which is good in light resistance and durability, by using said metal-containing azo compound in the recording layer.

In a preferred aspect the invention provides new dyes, suitable for high speed recording media in a laser wavelength range of from 500 to 700 nm.

U.S. Pat. No. 5,808,015 (Bayer) inter alia discloses dyestuffs of the formula below, for dyeing and printing hydrophobic synthetic fiber materials. The dyeing obtained with such compounds is described to be very deep and the hues are clear, brilliant, and provide a good thermo fixing fastness (see Table 1 in column 32).

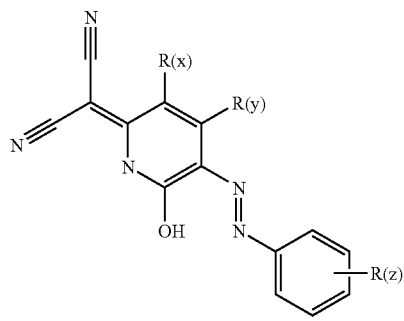

wherein preferably R(z) may be —$NO_2$ in ortho or para position, R(x) may be —CN and R(y) may be —$CH_3$.

U.S. Pat. No. 6,627,742 (DyStar) discloses hydroxypyridonemethide azo dyes of the formula below. The dyes are described to provide a good general fastness and an excellent thermo migration and sublimation fastness. The dyes are used for dyeing and printing hydrophobic fibers.

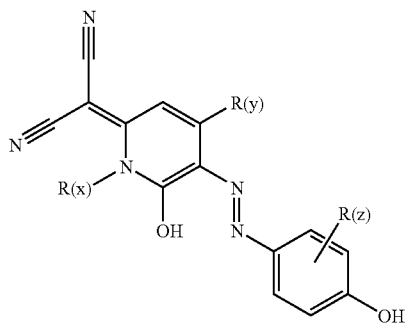

wherein preferably R(z) may be —$NO_2$ in ortho position, R(x) may be $C_{1-4}$ alkyl and R(y) may be hydrogen.

Amino antipyrylazo dyes of the below general formulae are known for many years (see for example DE 1076078 A and U.S. Pat. No. 2,993,884):

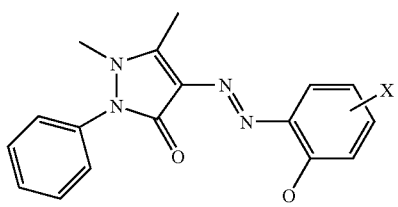

-continued

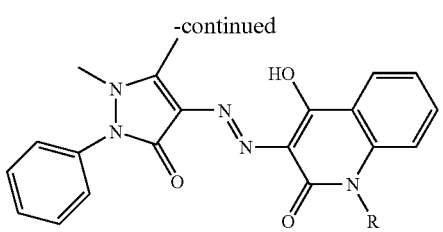

In addition to their uses as classical dyes for textiles or as dyes for copying processes, they are widely used as metallochromic indicators for spectrophotometric determination of metal contents. Extensive studies have been published on such type of complexation reactions and most of the classical aromatic diazo ligands have been investigated and described in the literature (see for example Bezdekova et al; *Czech. Collection of Czechoslovak Chemical Communications*, 1968, 33, 12, 4178-87 or more recently Shoukry M et al; *Synthesis and reactivity in Inorganic and Metal-Organic Chemistry*, 1997, 27, 5, 737-750). These azo derivatives behave generally as monobasic tridentate ligands towards metals like nickel, copper or manganese.

It now has been found, that certain couplers known in the art can react with amino antipyrine heterocycle derivates to give azo dyes of the following formula (I):

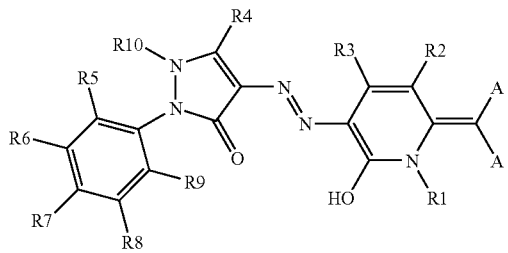

These dyes of the general formula (I), when carefully selected from a substitution point of view, can act as ligands for metal complexes of the general formula (II):

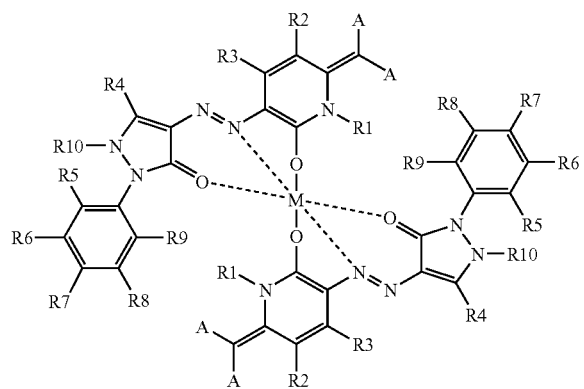

wherein $R_1$ to $R_{10}$ and A as well as M are defined as below.

Observations on coordinative behaviour of this type of ligands show that they act mainly as uninegatively charged tridentate chelating agents, whereas the pyrazolone equivalents, well known as solvent soluble dyes, mainly act as dianions towards metal atoms (because of the enol tautomerism). It is worth to mention that usually the decomposition ranges of the pyrazolone derivates are broader than that of the antipyrine derivates. The decomposition range of a ligand is a limiting factor in optical recording.

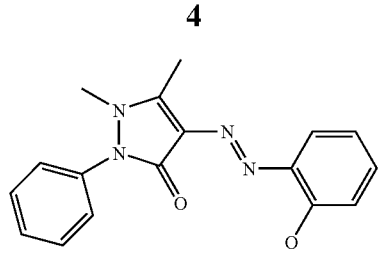
"antipyrine"

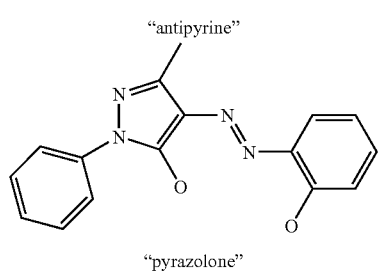
"pyrazolone"

BRIEF DESCRIPTION OF THE INVENTION

The present invention relates to azo compounds of the general formula (I) and to the metal complexes of general formula (II) made of one or more antipyrine based azo-dyes of the general formula (I) and a metal.

The invention further relates to an optical layer comprising said metal complexes and to an optical recording medium prepared by employing such metal complexes. The dyes and the optical layer according to the invention are excellent in information recording and retrieving characteristics by means of a semiconductor laser having a short wavelength. They further provide good light resistance and durability.

DETAILED DESCRIPTION OF THE INVENTION

The antipyrine based ligands according to the invention have the general formula (I)

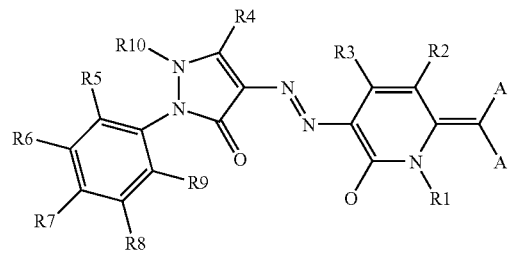

The antipyrine based metalazo complexes according to the invention have the general formula (II)

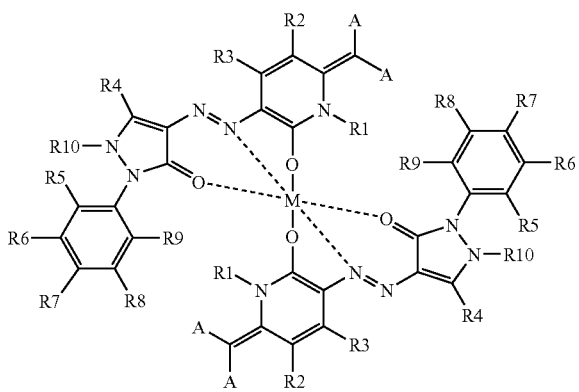

wherein

M represents a metal atom;

A is cyano, $C_{1-4}$alkoxy, carbamyl, —N—$C_{1-4}$alkylcarbamyl (wherein alkyl is unsubstituted or substituted by $C_{1-4}$alkoxy), N-Phenylcarbamyl (wherein phenyl is unsubstituted or substituted by $C_{1-4}$alkyl or $C_{1-4}$alkoxy), acetyl, benzoyl, 4-nitrophenyl or 4-cyanophenyl;

$R_1$ and $R_{10}$ are independently selected from hydrogen, $C_{1-8}$alkyl, phenyl or benzyl;

$R_2$, $R_3$ and $R_4$ independently are selected from hydrogen, —$CH_3$, —$C_2H_5$, —$CH(CH_3)_2$, phenyl, —CN, —Cl, —Br, —CN, —$CF_3$;

$R_5$ to $R_9$ independently are selected from hydrogen, —Cl, —CN, —Br, —$CF_3$, $C_{1-4}$ alkyl, chloromethyl, $C_{1-4}$-alkoxymethyl or phenoxymethyl, $NO_2$ or sulfonamide group.

For the purposes of the present invention, the formula (I) in its general and preferred meanings includes all possible tautomeric forms.

In a preferred aspect, the present invention is directed to a dye compound of formula (II) wherein $R^1$ is selected from H, —$CH_3$, —$C_2H_5$;

$R^2$ is selected from H or —CN;

$R^3$ is selected from H, —$CH_3$, —$H_5$, —$CH(CH_3)_2$, phenyl or $CF_3$;

$R^4$ is selected from H, —$CH_3$, —$H_5$, —$CH(CH_3)_2$, phenyl or $CF_3$;

$R^5$, $R^6$, $R^7$, $R^8$, $R^9$ are each hydrogen;

$R^{10}$ is selected from H, —$CH_3$, —$C_2H_5$;

A is selected from CN, COOR;

M is selected from the group consisting of Ni, Cu, Zn, Al, Fe, Pd, Pt, Co, Cr.

In a more preferred aspect, the present invention is directed to a dye compound of formula (III) or (IV)

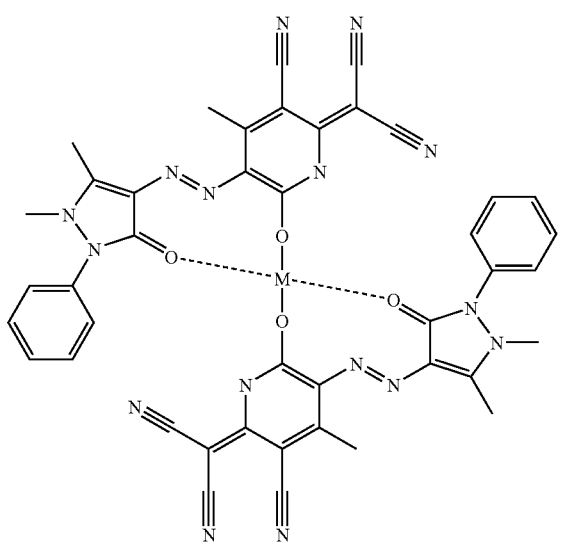

(III)

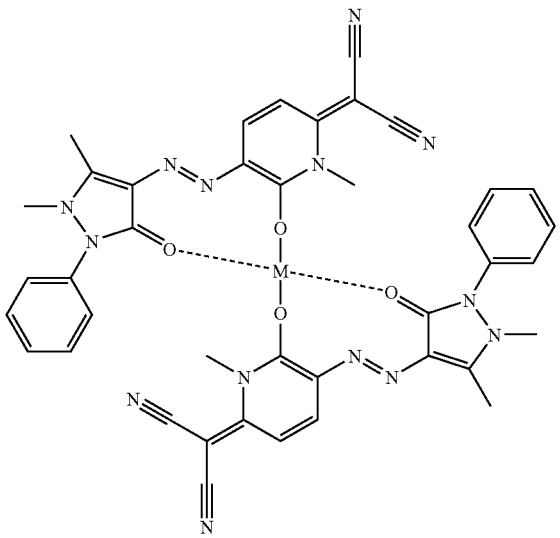

(IV)

wherein in a most preferred aspect M is nickel, zinc, copper, cobalt, chromium.

The antipyrine based azo-dyes (I) and their corresponding complexes (II) are easily synthesized with high yields and high purities at low costs.

The present invention further relates to an optical layer comprising a compound of formula (II) as described above and to the use of said optical layers for optical data recording media. An optical layer according to the invention may also comprise a mixture of two or more, preferably of two dye compounds of formula (II).

Compounds of general formula (II) possess the required optical characteristics for high-density recording materials in a laser wavelength range of from 500 to 700 nm. They possess an excellent solubility in organic solvents, an excellent light stability and a decomposition temperature of 240-350° C.

In particular the antipyrine-azo based metal complexes (II) possess a good light sensitivity and superior chemical and thermal stability in the recording layer of recordable optical discs, for example in WORM (write only read many) disc formats.

Preparation of the Dyes (I)

The coupling reaction may be carried out in aqueous and non-aqueous solvents. Non-aqueous solvents are alcohols such as methanol, ethanol, propanol, butanol, pentanol, etc., dipolar aprotic solvents such as DMF, DMSO, NMP and water-immiscible solvents such as toluene or chloro-benzene.

The coupling is preferably carried out in a stoichiometric ratio of coupling component and diazo component. The coupling is generally done at temperatures between −30° C. to 100° C., preference being given to temperatures of −10° C. to 30° C., and particular preference to temperatures of −5° C. to 10° C.

The coupling may be carried out in an acidic as well as an alkaline medium. Preference is given to pH <10, particular preference to pH <7.0, very particular preference to pH <5.0.

Preparation of the Metal Complexes (II)

Preferably, the complexes are prepared by reaction of a solution of one equivalent of a metal salt with a boiling solution of two equivalent of the corresponding dye. The precipitate is isolated following standard methods.

The solvents used in the process are preferably selected from the group consisting of $C_{1-8}$ alcohols, alkylnitriles, aromatics, dimethylformamide, N-methylpyrolidone or a mixture of one of these solvents with water or water itself. Most preferred solvents used in the process are $C_{1-8}$ alcohols.

Preparation of an Optical Layer

An optical layer according to the invention comprises a metal complex of formula (II) or a mixture of metal complexes of formula (II).

A method for producing an optical layer according to the invention comprises the following steps
(a) Providing a substrate
(b) Dissolving a dye compound or a mixture of dye compounds of formula (II) in an organic solvent to form a solution,
(c) Coating the solution (b) on the substrate (a);
(d) Evaporating the solvent to form a dye layer.

Preparing of the High Density Optical Recording Medium

A method for producing an optical recording medium comprising an optical layer according to the invention comprises the following additional steps
(e) sputtering a metal layer onto the dye layer
(f) applying a second polymer based layer to complete the disk.

A high-density data storage medium according to the invention therefore preferably is a recordable optical disc comprising: a first substrate, which is a transparent substrate with grooves, a recording layer (optical layer), which is formed on the first substrate surface using the metalazo compounds of formula (II), a reflective layer formed on the recording layer, a second substrate, which is a transparent substrate with grooves connected to the reflective layer with an attachment layer.

The metalazo complexes of formula (II) in the form of a solid film have a high refractive index at the longer wavelength flank of the absorption band, which preferably achieves a peak value of from 2.0 to 3.0 in the range of from 600 to 700 nm. The metalazo complexes of formula (II) allow providing a medium having high reflectivity as well as high sensitivity and good playback characteristics in the desired spectral range.

(a) Substrate

The substrate, which functions as support for the layers applied thereto, is advantageously semi-transparent (T>10%) or preferably transparent (T>90%). The support can have a thickness of from 0.01 to 10 mm, preferably from 0.1 to 5 mm.

Suitable substrates are, for example, glass, minerals, ceramics and thermosetting or thermoplastic plastics. Preferred supports are glass and homo- or co-polymeric plastics. Suitable plastics are, for example, thermoplastic polycarbonates, polyamides, polyesters, polyacrylates and polymethacrylates, polyurethanes, polyolefins, polyvinyl chloride, polyvinylidene fluoride, polyimides, thermosetting polyesters and epoxy resins.

The most preferred substrates are polycarbonate (PC) or polymethylmethacrylate (PMMA).

The substrate can be in pure form or may also comprise customary additives, for example UV absorbers or dyes, as proposed e.g. in JP 04/167239 as light-stabilizers for the recording layer. In the latter case it may be advantageous for the dye added to the support substrate to have an absorption maximum hypso-chromically shifted relative to the dye of the recording layer by at least 10 nm, preferably by at least 20 nm.

The substrate is advantageously transparent over at least a portion of the range from 600 to 700 nm, so that it is permeable to at least 90% of the incident light of the writing or readout wavelength. The substrate has preferably on the coating side a spiral guide groove having a groove depth of from 50 to 500 nm, a groove width of from 0.2 to 0.8 μm and a track spacing between two turns of from 0.4 to 1.6 μm, especially having a groove depth of from 100 to 200 nm, a groove width of 0.3 μm and a spacing between two turns of from 0.6 to 0.8 μm. The storage media according to the invention are therefore suitable for the optical recording of DVD media currently having a pit width of 0.4 μm and track spacing of 0.74 μm. The increased recording speed relative to known media allows synchronous recording or, for special effects, even accelerated recording of video sequences with excellent image quality.

(b) Organic Solvents

Organic solvents are selected from $C_{1-8}$ alcohol, halogen substituted $C_{1-8}$ alcohols, $C_{1-8}$ ketone, $C_{1-8}$ ether, halogen substituted $C_{1-4}$ alkane, or amides.

Preferred $C_{1-8}$ alcohols or halogen substituted $C_{1-8}$ alcohols are for example methanol, ethanol, isopropanol, diacetone alcohol (DAA), 2,2,3,3-tetrafluoropropanol, trichloroethanol, 2-chloroethanol, octafluoropentanol or hexafluorobutanol.

Preferred $C_{1-8}$ ketones are for example acetone, methylisobutylketone, methylethylketone, or 3-hydroxy-3-methyl-2-butanone.

Preferred halogen substituted $C_{1-4}$ alkanes are for example chloroform, dichloromethane or 1-chlorobutane.

Preferred amides are for example dimethylformamide or dimethylacetamide.

(c) Recording Layer

The recording layer (optical layer) is preferably arranged between the transparent substrate and the reflecting layer. The thickness of the recording layer is from 10 to 1000 nm, preferably from 30 to 300 nm, especially about 80 nm, for example from 60 to 120 nm.

The absorption of the recording layer is typically from 0.1 to 1.0 at the absorption maximum. The layer thickness is chosen in known manner depending upon the respective refractive indices in the non-written state and in the written state at the reading wavelength, so that in the non-written state constructive interference is obtained, but in the written state destructive interference is obtained, or vice versa.

The reflecting layer, the thickness of which can be from 10 to 150 nm, preferably has high reflectivity (R>45%, especially R>60%), coupled with low transparency (T<10%). In further embodiments, for example in the case of media having a plurality of recording layers, the reflector layer may likewise be semitransparent, that is to say may have comparatively high transparency (for example T>50%) and low reflectivity (for example R<30%).

The uppermost layer, for example the reflective layer or the recording layer, depending upon the layer structure, optionally is provided with a protective layer having a thickness of from 0.1 to 1000 μm, preferably from 0.1 to 50 μm, especially from 0.5 to 15 gm. Such a protective layer can, if desired, serve also as adhesion promoter for a second substrate layer applied thereto, which is preferably from 0.1 to 5 mm thick and consists of the same material as the support substrate.

The reflectivity of the entire recording medium is preferably at least 15%, especially at least 40%.

The main features of the recording layer according to the invention are the very high initial reflectivity in the said wavelength range of the laser diodes, which can be modified with especially high sensitivity; the high refractive index; the narrow absorption band in the solid state; the good uniformity of the script width at different pulse durations; the good light stability; and the good solubility in polar solvents.

The use of metal complexes of formula (II) results in advantageously homogeneous, amorphous and low-scattering recording layers having a high refractive index. The absorption edge is surprisingly steep even in the solid phase. Further advantages are high light stability in daylight and under laser radiation of low power density with, at the same time, high sensitivity under laser radiation of high power density, uniform script width, high contrast, and also good thermal stability and storage stability.

The recording layer, instead of comprising a single compound of formula (II), may also comprise a mixture of such compounds according to the invention. By the use of mixtures, for example mixtures of isomers or homologues as well as mixtures of different structures, the solubility can often be increased and/or the amorphous content improved.

For a further increase in stability it is also possible, if desired, to add known stabilizers in customary amounts, for example a nickel dithiolate as light stabilizer, as described in JP 04/025493.

The recording layer comprises a compound of formula (II) or a mixture of such compounds preferably in an amount sufficient to have a substantial influence on the refractive index, for example at least 30% by weight, more preferably at least 60% by weight, most preferably at least 80% by weight.

Further customary components are, for example other chromophores (for example those disclosed in WO-01/75873, or others having an absorption maximum at from 300 to 1000 nm), stabilizers, $^1O_2$-, triplet- or luminescence quenchers, melting-point reducers, decomposition accelerators or any other additives that have already been described in optical recording media. Preferably, stabilizers or fluorescence-quenchers are added if desired.

When the recording layer comprises further chromophores, they may in principle be any dye that can be decomposed or modified by the laser radiation during the recording, or they may be inert towards the laser radiation. When the further chromophores are decomposed or modified by the laser radiation, this can take place directly by absorption of the laser radiation or can be induced indirectly by the decomposition of the compounds of formula (II) according to the invention, for example thermally.

Naturally, further chromophores or colored stabilizers may influence the optical properties of the recording layer. It is therefore preferable to use further chromophores or coloured stabilizers, the optical properties of which conform as far as possible to those of the compounds formula (II) or are as different as possible, or the amount of further chromophores is kept small.

When further chromophores having optical properties that conform as far as possible to those of compounds formula (II) are used, preferably this should be the case in the range of the longest-wavelength absorption flank. Preferably the wavelengths of the inversion points of the further chromophores and of the compounds of formula (II) are a maximum of 20 nm, especially a maximum of 10 nm, apart. In that case the further chromophores and the compounds of formula (II) should exhibit similar behavior in respect of the laser radiation, so that it is possible to use as further chromophores known recording agents the action of which is synergistically enhanced by the compounds of formula (II).

When further chromophores or colored stabilizers having optical properties that are as different as possible from those of compounds of formula (II) are used, they advantageously have an absorption maximum that is hypso-chromically or batho-chromically shifted relative to the metal complex of formula (II). In that case the absorption maxima are preferably at least 50 nm, especially at least 100 nm, apart.

Examples thereof are UV absorbers that are hypso-chromic to the dye of formula (II) or colored stabilizers that are bathochromic to the dye of formula (II) and have absorption maxima lying, for example, in the NIR or IR range.

Other dyes can also be added for the purpose of color-coded identification, color-masking ("diamond dyes") or enhancing the aesthetic appearance of the recording layer. In all those cases, the further chromophores or colored stabilizers should preferably exhibit behavior towards light and laser radiation that is as inert as possible.

When another dye is added in order to modify the optical properties of the compounds of formula (II), the amount thereof is dependent upon the optical properties to be achieved. The person skilled in the art will find little difficulty in varying the ratio of additional dye to compound of formula (II) until he obtains his desired result.

When chromophores or colored stabilizers are used for other purposes, the amount thereof should preferably be small so that their contribution to the total absorption of the recording layer in the range of from 600 to 700 nm is a maximum of 20%, preferably a maximum of 10%. In such a case, the amount of additional dye or stabilizer is advantageously a maximum of 50% by weight, preferably a maximum of 10% by weight, based on the recording layer.

Most preferably, however, no additional chromophore is added, unless it is a colored stabilizer.

Further chromophores that can be used in the recording layer in addition to the compounds of formula (II) are, for example, cyanines and cyanine metal complexes (U.S. Pat. No. 5,958,650), styryl compounds (U.S. Pat. No. 6,103,331), oxonol dyes (EP-A-833 314), azo dyes and azo metal complexes (JP-A-11/028865), phthalocyanines (EP-A-232 427, EP-A-337 209, EP-A-373 643, EP-A-463 550, EP-A-492 508, EP-A-509 423, EP-A-511 590, EP-A-513 370, EP-A-514 799, EP-A-518 213, EP-A-519 419, EP-A-519 423, EP-A-575 816, EP-A-600 427, EP-A-676 751, EP-A-712 904, WO-98/14520, WO-00/09522, PCT/EP-02/03945), porphyrins and azaporphyrins (EP-A-822 546, U.S. Pat. No. 5,998,093), dipyrromethene dyes and metal chelate compounds thereof (EP-A-822 544, EP-A-903 733), xanthene dyes and metal complex salts thereof (U.S. Pat. No. 5,851,621) or quadratic acid compounds (EP-A-568 877), or oxazines, dioxazines, diazastyryls, formazans, anthraquinones or phenothiazines; this list is on no account exhaustive and the person skilled in the art will interpret the list as including further known dyes.

Stabilizers, $^1O_2$-, triplet- or luminescence-quenchers are, for example, metal complexes of N- or S-containing enolates, phenolates, bisphenolates, thiolates or bisthiolates or of azo, azomethine or formazan dyes, such as bis(4-dimethylaminodithiobenzil)nickel [CAS N° 38465-55.3]. Hindered phenols and derivatives thereof such as o-hydroxyphenyl-triazoles or -triazines or other UV absorbers, such as hindered amines (TEMPO or HALS, as well as nitroxides or NOR-HALS), and also as cations diimmonium, Paraquat™ or Orthoquat salts, such as ®Kayasorb IRG 022, ®Kayasorb IRG 040, optionally also as radical ions, such as N,N,N',N'-tetrakis(4-dibutylaminophenyl)-p-phenylene amine-ammonium hexafluorophosphate, hexafluoroantimonate or perchlorate. The latter are available from Organica (Wolfen/DE); ®Kayasorb brands are available from Nippon Kayaku Co. Ltd.

Also suitable are neutral metal complexes, for example those metal complexes disclosed in EP 0 822 544, EP 0 844 243, EP 0 903 733, EP 0 996 123, EP 1 056 078, EP 1 130 584 or U.S. Pat. No. 6,162,520.

The person skilled in the art will know from other optical information media, or will easily identify, which additives in which concentration are best suited to which purpose. Suitable concentrations of additives are, for example, from 0.001 to 1000% by weight, preferably from 1 to 50 (% by weight, based on the recording medium of formula (II)).

(e) Reflecting Layer

Reflecting materials suitable for the reflective layer include especially metals, which provide good reflection of the laser radiation used for recording and playback, for example the metals of Main Groups III, IV and V and of the Sub-groups of the Periodic Table of the Elements. Al, In, Sn, Pb, Sb, Bi, Cu, Ag, Au, Zn, Cd, Hg, Sc, Y, La, Ti, Zr, Hf, V, Nb, Ta, Cr, Mo, W, Fe, Co, Ni, Ru, Rh, Pd, Os, Ir, Pt, Ce, Pr, Nd, Pm, Sm, Eu, Gd, Tb, Dy, Ho, Er, Tm, Yb and Lu and alloys thereof are especially suitable. Special preference is given to a reflective layer of aluminum, silver, copper, gold or an alloy thereof, on account of their high reflectivity and ease of production.

(f) Cover Layer/Protective Layer

Materials suitable for the cover layer/protective layer include plastics, which are applied in a thin layer to the support or the uppermost layer either directly or with the aid of adhesive layers. It is advantageous to select mechanically and thermally stable plastics having good surface properties, which may be modified further.

The plastics may be thermosetting plastics and thermoplastic plastics. Preference is given to radiation-cured (e.g. using UV radiation) protective layers, which are particularly simple and economical to produce. A wide variety of radiation-curable materials are known. Examples of radiation-curable monomers and oligomers are acrylates and methacrylates of diols, triols and tetrols, polyimides of aromatic tetracarboxylic acids and aromatic diamines having $C_1$-$C_4$alkyl groups in at least two ortho-positions of the amino groups, and oligomers with dialkylmaleinimidyl groups, e.g. dimethyl maleinimidyl groups.

The recording media according to the invention may also have additional layers, for example interference layers. It is also possible to construct recording media having a plurality of (for example two) recording layers. The structure and the use of such materials are known to the person skilled in the art. Preferred, if present, are interference layers that are arranged between the recording layer and the reflecting layer and/or between the recording layer and the substrate and consist of a dielectric material, for example as described in EP 353 393 of $TiO_2$, $Si_3N_4$, ZnS or silicone resins.

The recording media according to the invention can be produced by processes known in the art.

Coating Methods

Suitable coating methods are, for example, immersion, pouring, brush-coating, blade-application and spin-coating, as well as vapor-deposition methods carried out under a high vacuum. When pouring methods are used, solutions in organic solvents are generally used. When solvents are employed, care should be taken that the supports used are insensitive to those solvents. Suitable coating methods and solvents are described, for example, in EP-A-401 791.

The recording layer is preferably applied by spin-coating with a dye solution, solvents that have proved satisfactory are preferably alcohols, e.g. 2-methoxyethanol, n-propanol, isopropanol, isobutanol, n-butanol, amyl alcohol or 3-methyl-1-butanol or preferably fluorinated alcohols, e.g. 2,2,2-trifluoroethanol or 2,2,3,3-tetrafluoro-1-propanol, octafluoropentanol and mixtures thereof. It will be understood that other solvents or solvent mixtures can also be used, for example those solvent mixtures described in EP-A-511 598 and EP-A-833 316. Ethers (dibutyl ether), ketones (2,6-dimethyl-4-heptanone, 5-methyl-2-hexanone) or saturated or unsaturated hydrocarbons (toluene, xylene) can also be used, for example in the form of mixtures (e.g. dibutyl ether/2,6-dimethyl-4-heptanone) or mixed components.

The person skilled in the art of spin-coating will in general routinely try out all the solvents with which is he is familiar, as well as binary and ternary mixtures thereof, in order to discover the solvents or solvent mixtures which result in a high-quality and, at the same time, cost-effective recording layer containing the solid components of his choice. Known methods of process engineering can also be employed in such optimization procedures, so that the number of experiments to be carried out can be kept to a minimum.

The invention therefore relates also to a method of producing an optical recording medium, wherein a solution of a compound of formula (II) in an organic solvent is applied to a substrate having pits. The application is preferably carried out by spin-coating.

The application of the metallic reflective layer is preferably effected by sputtering, vapor-deposition in vacuum or by chemical vapor deposition (CVD). The sputtering technique is especially preferred for the application of the metallic reflective layer on account of the high degree of adhesion to the support. Such techniques are known and are described in specialist literature (e.g. J. L. Vossen and W. Kern, "Thin Film Processes", Academic Press, 1978).

Readout Methods

The structure of the recording medium according to the invention is governed primarily by the readout method; known function principles include the measurement of the change in the transmission or, preferably, in the reflection, but it is also known to measure, for example, the fluorescence instead of the transmission or reflection.

When the recording material is structured for a change in reflection, the following structures, can be used: transparent support/recording layer (optionally multilayered)/reflective layer and, if expedient, protective layer (not necessarily transparent); or support (not necessarily transparent)/reflective layer/recording layer and, if expedient, transparent protective layer. In the first case, the light is incident from the support side, whereas in the latter case the radiation is incident from the recording layer side or, where applicable, from the protective layer side. In both cases the light detector is located on the same side as the light source. The first-mentioned structure of the recording material to be used according to the invention is generally preferred.

When the recording material is structured for a change in light transmission, the following different structure comes into consideration: transparent support/recording layer (optionally multilayered) and, if expedient, transparent protective layer. The light for recording and for readout can be incident either from the support side or from the recording layer side or, where applicable, from the protective layer side, the light detector in this case always being located on the opposite side.

Suitable lasers are those having a wavelength of 600-700 nm, for example commercially available lasers having a wavelength of 602, 612, 633, 635, 647, 650, 670 or 680 nm, especially semi-conductor lasers, such as GaAsAI, InGaAIP or GaAs laser diodes having a wavelength especially of about 635, 650 or 658 nm. The recording is done, for example, point for point, by modulating the laser in accordance with the mark lengths and focusing its radiation onto the recording layer. It is known from the specialist literature that other methods are currently being developed which may also be suitable for use.

The process according to the invention allows the storage of information with great reliability and stability, distinguished by very good mechanical and thermal stability and by high light stability and by sharp boundary zones of the pits. Special advantages include the high contrast, the low jitter and the surprisingly high signal/noise ratio, so that excellent readout is achieved.

The readout of information is carried out according to methods known in the art by registering the change in absorption or reflection using laser radiation, for example as described in "CD-Player and R-DAT Recorder" (Claus Biaesch-Wiepke, Vogel Buchverlag, Würzburg 1992).

The optical recording medium according to the invention is preferably a recordable optical disc of the WORM type. It may be used, for example, as a playable DVD (digital versatile-disk), as storage medium for a computer or as an identification and security card or for the production of diffractive optical elements, for example holograms.

The invention accordingly relates also to a method for the optical recording, storage and playback of information, wherein a recording medium according to the invention is used. The recording and the playback advantageously take place in a wavelength range of from 500 to 700 nm.

It has been found, that the new metal complexes of formula (II) according to the invention enhance the photosensitivity and the stability to light and heat compared to dyes already known in the art. The new metal complexes of formula (II) according to the invention have a decomposition temperature of 240-350° C. Additionally, these compounds show an extremely good solubility in organic solvents, which is ideal for the spin-coating process to manufacture optical layers.

Thus, it is of great advantage to use these new compounds in the recording layer of high-density recordable optical discs.

EXAMPLES

Dye Ligands of General Formula (I)

Example 1

Preparation of the Coupler

A mixture of 45.3 g of 2,6-dichloropyridine and 76.4 ml of dimethyl sulphate was stirred at 100° C. for 24 hours. After cooling, the viscous solution was diluted with 90 ml of dimethylformamide, and a solution of 20 g of malononitrile in 30 ml of dimethylformamide and then 77.1 g of triethylamine were added dropwise, while cooling with ice. The mixture was subsequently stirred for 20 hours and 20 g of a yellow product were then filtered off with suction.

The presscake of [1-methyl-6-chloro-2(1 pyridinylidene] malononitrile so obtained was dropped into 100 ml of water and 100 ml of N-methylpyrrolidone and heated to 80° C. for 10 hours and at 90° C. for 5 hours, pH=10 being maintained by drop wise addition of 30% strength sodium hydroxide solution via a titrator. After this period, the mixture was diluted with a volume of 400 ml water and brought to pH=1 with concentrated hydrochloric acid. The green precipitate formed was filtered off with suction and washed with water. Yield: 9.5 g.

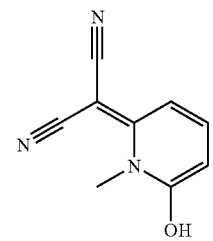

Diazotisation and Coupling

A mixture of 20.3 g of 4-amino antipyrine, 300 ml of water and 33 g of concentrated hydrochloric acid (30%) was gradually admixed with 24.8 ml of sodium nitrite at 0° C.; After 1 hour of reaction at 0° C., the violet-pink diazotization solution was added dropwise to an alkaline solution of 17.3 g of 2-(6-Hydroxy-1-methyl-1H-pyridin-2-ylidene)-malononitrile while maintaining pH at 7.5-9 with sodium hydroxide (30%). The batch was stirred 3 hours then filtered with suction. The precipitate was washed with water and dried. The copper-green presscake yielded 33.2 g of dye of the following formula (2).

Yield: 85.8%. Decomposition point: 271° C.; UV-Vis $(CH_2Cl_2)$ $\lambda_{max}$: 539 nm; $\epsilon(\lambda_{max})$: 47600 $l.mol^{-1}.cm^{-1}$

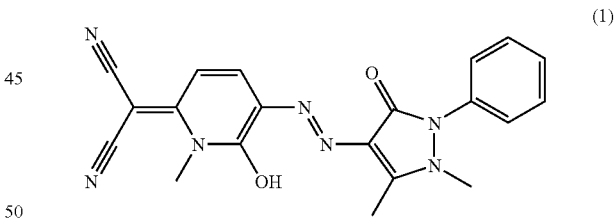

Metal Complexes of General Formula (II)

Examples 2-5

5 g of the monoazo dyestuff (1) described in example 1 are suspended in 60 parts of methanol and 2.5 parts of sodium acetate. After heating up to reflux, 2.0 parts of nickel acetate in 35 parts of water are added for over one hour, whereupon a dark violet suspension of the nickel complex results. The dyestuff solution is cooled down to room temperature and the resulting precipitate is stirred for one hour, filtered and the residue washed salt free with deionized water and dried. Yield: 90% 4.0 g of the compound IIa with the following formula is obtained.

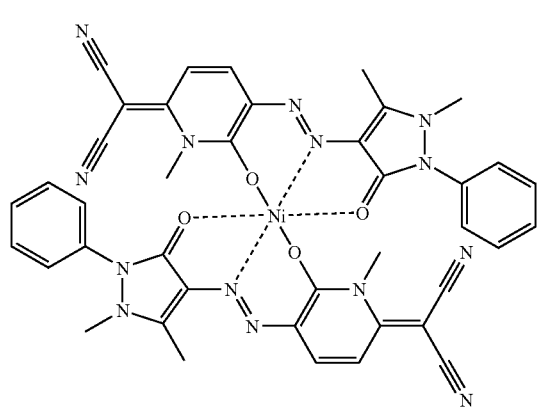

(2)

| Exp. | M | λ max | $\epsilon_{\lambda max}$ | DP ° C. | HR | C % | N % | H % |
|---|---|---|---|---|---|---|---|---|
| 2 | Ni | 561 | 160 | 329 | 7 | 57.1 (57.6) | 23.1 (23.5) | 4.0 (4.1) |
| 3 | Zn | 566 | 161 | 339 | 25 | 56.8 (57.2) | 23.1 (23.3) | 3.9 (4.1) |
| 4 | Cu | 577 | 140 | 275 | 50 | 56.2 (57.3) | 22.9 (23.4) | 4.1 (4.1) |
| 5 | Co | 557 | 135 | 337 | 10 | 57.2 (57.6) | 23.2 (23.5) | 4.0 (4.1) |

M: metal;

$\epsilon$ in l/g/cm measured at λ max;

DP: decomposition point in degree Celsius;

HR: heat release in W/g;

C, N and H are results from the elemental analysis;

Application Example 1.8 g of a new compound of formula (2-5) is dissolved in 2,2,3,3-tetrafluoropropanol to form 100 ml solution. This solution is applied on the first substrate by coating. Afterwards, a drying procedure is employed to form a recording layer of the new metal complex on the substrate surface.

The recording layer is coated with a reflective layer by sputtering a metal material, followed by the application of a resin protection layer. Finally, a second substrate is provided to the reflective layer to form a protection layer.

To evaluate the final DVD-R product a PULSTEC DDU-1000 evaluation test machine was used to write and read the test results. The recording conditions were: the constant linear velocity (CLV) is 3.5 m/s, the wavelength is 658 nm, the numerical aperture (NA) is 0.6, and the writing power is 7-14 mW. The reading conditions were: the CLV is 2.5 m/s, the wavelength is 658 nm, the NA is 0.6, and the reading power is 0.5 to 1.5 mW.

Optical recording media with an optical layer comprising the dyes obtained according to example 2-5 were manufactured and tested according to the procedure previously given.

Test Results for the Described Metalazo Complexes of Type III and Conclusion

At a relatively high recording speed, the results obtained are excellent. The marks are more precisely defined relative to the surrounding medium, and thermally induced deformations do not occur. The error rate (BLER) and the statistical variations in mark length (jitter) are also relatively low both at normal recording speed and at high recording speed, so that an error-free recording and playback can be achieved over a large speed range. There are virtually no rejects even at high recording speed, and the reading of written media is not slowed down by the correction of errors. The advantages are obtained in the entire range of from 600 to 700 nm (preferably from 630 to 690 nm), but are especially marked at from 640 to 680 nm, more especially from 650 to 670 nm, particularly at 658±5 nm.

The invention claimed is:

1. An antipyrine azo ligand of the formula (I)

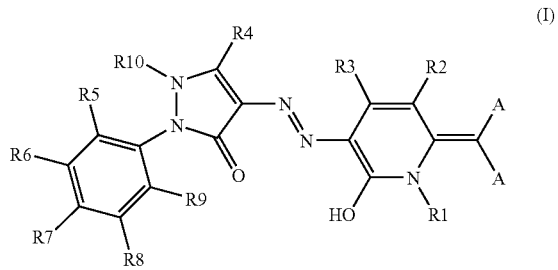

(I)

wherein

A is cyano, $C_{1-4}$alkoxy, carbamyl, —N—$C_{1-4}$alkylcarbamyl, wherein the alkyl is unsubstituted or substituted by $C_{1-4}$ alkoxy; N-Phenylcarbamyl, wherein the phenyl is unsubstituted or substituted by $C_{1-4}$alkyl or $C_{1-4}$alkoxy; acetyl, benzoyl, 4-nitrophenyl or 4-cyanophenyl;

$R_1$ and $R_{10}$ are independently selected from the group consisting of hydrogen, $C_{1-8}$alkyl, phenyl and benzyl;

$R_2$, $R_3$ and $R_4$ independently are selected from the group consisting of hydrogen, —$CH_3$, —$C_2H_5$, —$CH(CH_3)_2$, phenyl, —CN, —Cl, —Br, —CN, and —$CF_3$;

$R_5$ to $R_9$ independently are selected from the group consisting of hydrogen, —Cl, —CN, —Br, —$CF_3$, $C_{1-4}$ alkyl, chloromethyl, $C_{1-4}$-alkoxymethyl, phenoxymethyl, $NO_2$ and sulfonamide group.

2. An antipyrine azo metal complex dye compound of the formula (II)

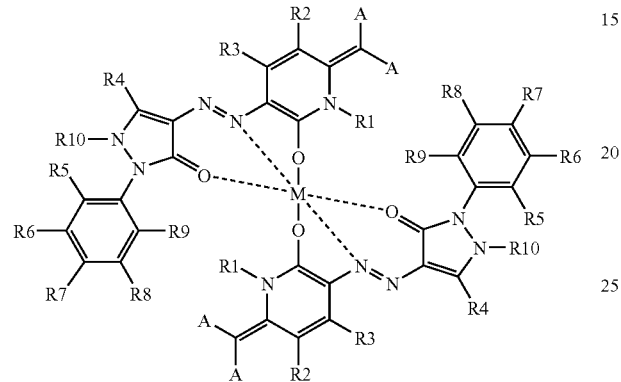

(II)

wherein

A is cyano, $C_{1-4}$alkoxy, carbamyl, —N—$C_{1-4}$alkylcarbamyl, wherein the alkyl is unsubstituted or substituted by $C_{1-4}$alkoxy; N-Phenylcarbamyl, wherein the phenyl is unsubstituted or substituted by $C_{1-4}$alkyl or $C_{1-4}$alkoxy; acetyl, benzoyl, 4-nitrophenyl or 4-cyanophenyl;

$R_1$ and $R_{10}$ are independently selected from the group consisting of hydrogen, $C_{1-8}$alkyl, phenyl and benzyl;

$R_2$, $R_3$ and $R_4$ independently are selected from the group consisting of hydrogen, —$CH_3$, —$C_2H_5$, —$CH(CH_3)_2$, phenyl, —CN, —Cl, —Br, —CN, and —$CF_3$;

$R_5$ to $R_9$ independently are selected from the group consisting of hydrogen, —Cl, —CN, —Br, —$CF_3$, $C_{1-4}$ alkyl, chloromethyl, $C_{1-4}$-alkoxymethyl, phenoxymethyl, $NO_2$ and sulfonamide group and M is a metal atom.

3. The antipyrine azo metal complex dye according to claim 2, wherein $R^1$ is H, —$CH_3$, or —$C_2H_5$;

$R^2$ is H or —CN;

$R^3$ is H, —$CH_3$, —$C_2H_5$, —$CH(CH_3)_2$, phenyl or $CF_3$;

$R^4$ is H, —$CH_3$, —$C_2H_5$, —$CH(CH_3)_2$, phenyl or $CF_3$;

$R^5$, $R^6$, $R^7$, $R^8$, $R^9$ are each hydrogen;

$R^{10}$ is H, —$CH_3$, or —$C_2H_5$;

A is CN

M is Ni, Cu, Zn, Al, Fe, Pd, Pt, Co, or Cr.

4. The antipyrine azo metal complex dye according to claim 3, wherein the dye compound is of the formula (III) or (IV)

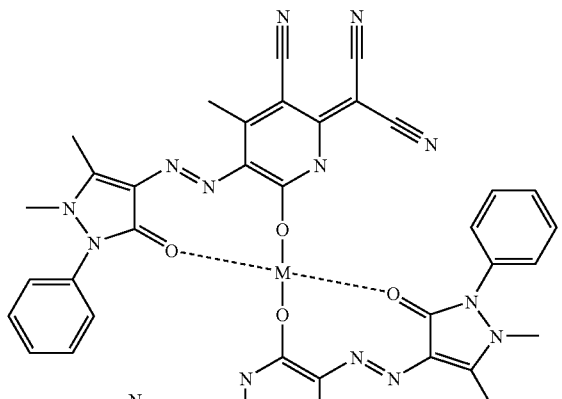

(III)

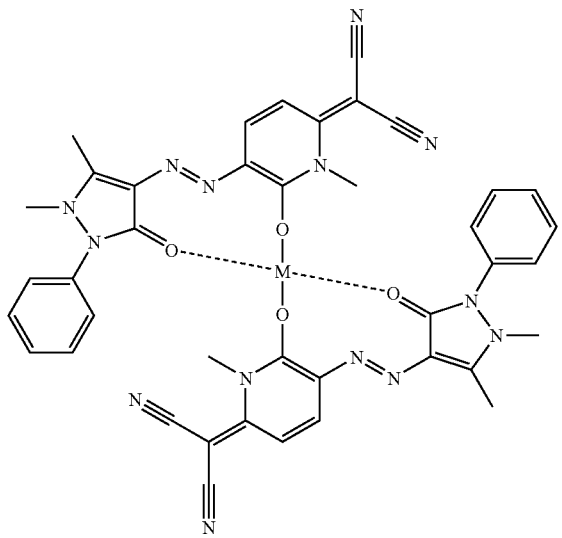

(IV)

wherein

M is nickel, zinc, copper, cobalt or chromium.

5. An optical layer comprising one or more antipyrine azo metal complex dye compounds according to formula (II) as defined in claim 2.

6. A method for producing an optical layer according to claim 5 on a substrate, comprising the steps of:
   (a) providing the substrate
   (b) dissolving one or more compounds of formula (II) in an organic solvent to form a solution,
   (c) coating the solution on at least one surface of the substrate;
   (d) evaporating the solvent to form the optical layer.

7. The method according to claim 6, wherein the organic solvent is selected from the group consisting of $C_{1-8}$ alcohol, halogen substituted $C_{1-8}$ alcohols, $C_{1-8}$ ketone, $C_{1-8}$ ether, halogen substituted $C_{1-4}$ alkane, and amides.

8. The method according to claim 7, wherein the $C_{1-8}$ alcohols or halogen substituted $C_{1-8}$ alcohols are selected from the group consisting of methanol, ethanol, isopropanol, diacetone alcohol (DAA), 2,2,3,3-tetrafluoropropanol, trichloroethanol, 2-chloroethanol, octafluoropentanol and hexafluorobutanol;

the $C_{1-8}$ ketones are selected from the group consisting of acetone, methylisobutylketone, methylethylketone, and 3-hydroxy-3-methyl-2-butanone;

the halogen substituted $C_{1-4}$ alkanes are selected from the group consisting of chloroform, dichloromethane and 1-chlorobutane; and the amides are selected from the group consisting of dimethylformamide and dimethylacetamide.

9. The method according to claim 6, wherein the substrate is polycarbonate (PC) or polymethylmethacrylate (PMMA).

10. An optical layer on a substrate made in accordance with the method of claim 6.

11. An optical recording medium comprising an optical layer on a substrate according to claim 10.

* * * * *